United States Patent
Harada et al.

(10) Patent No.: US 6,495,649 B2
(45) Date of Patent: Dec. 17, 2002

(54) SPHERICAL SILICONE FINE PARTICLES AND PROCESS FOR PRODUCING THE SAME

(75) Inventors: Yukinobu Harada, Tokyo (JP); Akira Takagi, Tokyo (JP)

(73) Assignee: GE Toshiba Silicones Co., Ltd., Tokyo (JP)

( * ) Notice: Subject to any disclaimer, the term of this patent is extended or adjusted under 35 U.S.C. 154(b) by 0 days.

(21) Appl. No.: 09/759,646

(22) Filed: Jan. 16, 2001

(65) Prior Publication Data

US 2001/0031849 A1 Oct. 18, 2001

(30) Foreign Application Priority Data

Jan. 13, 2000 (JP) ........................................ 2000-004634

(51) Int. Cl.[7] ................................................ C08G 77/08
(52) U.S. Cl. ............................ 528/39; 528/10; 528/12; 528/14; 528/21; 528/32
(58) Field of Search .............................. 528/10, 32, 14, 528/21, 12, 39

(56) References Cited

U.S. PATENT DOCUMENTS 5,204,432 A * 4/1993 Saito et al. .................... 528/10

* cited by examiner

*Primary Examiner*—Margaret G. Moore
(74) *Attorney, Agent, or Firm*—Sughrue Mion, PLLC

(57) ABSTRACT

Spherical silicone fine particles having an average particle diameter of 0.1 to 5 μm, which can be produced without decreasing a yield and also without conducting a dilution step, and a process for effectively producing the same. Spherical silicone particles are obtained by reacting an organotrialkoxysilane with a tetraalkoxysilane. Water in an amount of 20 to 150 moles is added to 1 mole of the silane mixture, which is subjected to hydrolysis under an acidic condition to obtain an aqueous or alcohol solution of an organosilanol and/or the partial hydrolyzed product thereof, and an aqueous alkaline solution is added thereto, mixed and allowed to stand to conduct polycondensation.

2 Claims, No Drawings

SPHERICAL SILICONE FINE PARTICLES AND PROCESS FOR PRODUCING THE SAME

FIELD OF THE INVENTION

The present invention relates to spherical silicone fine particles and the process for producing the same. More specifically, the present invention relates to spherical silicone fine particles having an average particle diameter of 0.1 to 5 μm and the process for effectively producing the same.

BACKGROUND OF THE INVENTION

A process described in JP-A-63-77940 (The term "JP-A" as used herein means an "unexamined published Japanese patent application") has conventionally been known as a process for producing spherical silicone fine particles. This production process obtains spherical silicone fine particles wherein the shape of the respective particles is independently truly spherical, by subjecting organotrialkoxy silane and/or partial hydrolyzed product thereof to hydrolysis and polycondensation at the interface between the organotrialkoxy silane and/or the partial hydrolyzed product thereof, or a mixed liquid of the organotrialkoxy silane and/or the partial hydrolyzed product thereof and an organic solvent as an upper layer, and a mixed liquid of ammonia and/or amine and an organic solvent as a lower layer.

Silicone fine particles obtained by this process have characteristics such that the particle shape is spherical, the hydrophobic property is high, the condensation ability is low, and the specific gravity is small. In view of those characteristics, the silicone fine particles are used as modification additives for imparting lubricating property to paints, plastic, rubber, cosmetics and paper, improving dispersibility, and giving light-scattering function.

However, the production process of such spherical silicone fine particles is complicated to maintain a reaction interface where the organotrialkoxysilane and/or the partial hydrolyzed product thereof are subjected to hydrolysis and polycondensation. As a result, there was the problem that productivity to time and the capacity of an apparatus is low.

In order to solve these problems, the present inventors proposed a process for producing spherical silicone fine particles comprising optionally diluting an aqueous/alcohol solution of an organosilane triol obtained by hydrolyzing an organoalkoxysilane and/or the partial condensation product thereof, adding an aqueous alkaline solution thereto, followed by mixing, and then keeping the resulting mixture in a stationary state (JP-A-2000-186148). According to this process, the hydrolysis and the polycondensation are effected in a uniform reaction state so that spherical silicone fine particles are obtained. Thus, complicated keeping of an interface where hydrolysis and polycondensation are effected is not required as in the conventional art and, therefore, productivity to time and the capacity of an apparatus can greatly be improved.

According to this process, an average particle diameter of spherical silicone fine particles obtained can be controlled in a range of 1 to 10 μm and the spherical silicone fine particles obtained have a characteristic such that the particle size distribution of the resulting particles is sharp as compared with the conventional art. The spherical silicone fine particles are compounded with plastics and used for a light diffuser panel of a liquid crystal display and for imparting lubricating property for enhancing running stability of a video tape for a high-quality image.

This process, however, has a problem in that it is difficult to obtain fine particles having an average particle size of less than 1 μm. Namely, according to this process, for obtaining particles having a relatively small average particle size, the concentration of a reaction product is required to decrease or a dilution step is required. Thus, in the production of particles having a relatively small average particle size, the productivity thereof to time and the capacity of an apparatus is low as compared with a case of obtaining particles having a relatively large average particle size.

SUMMARY OF THE INVENTION

The present invention has been made to solve these conventional problems.

Accordingly, one object of the present invention is to provide spherical silicone fine particles having an average particle diameter of 0.1 to 5 μm, which can be produced without decreasing the yield and also without a dilution step.

Another object of the present invention is to provide a process for effectively producing such spherical silicone fine particles.

As a result of extensive investigations to achieve the above-described objects, it has been found that the above-described objects could be achieved by adding an aqueous alkaline solution to an aqueous/alcohol solution of silanol (obtained by hydrolyzing a mixed silane comprising an organotrialkoxysilane and an organotetraalkoxysilane wherein four hydrolyzable groups are bonded to Si) and/or the partial condensation product thereof, mixing the resulting mixture rapidly and uniformly, and allowing the mixture obtained to stand. The present invention has been completed based on this finding.

The spherical silicone fine particles of the present invention is obtained by polycondensation reaction of an organotrialkoxysilane represented by the following formula (I):

$$R^1Si(X)_3 \qquad (I)$$

wherein $R^1$ represents a monovalent group selected from a group consisting of a substituted or unsubstituted alkyl group, alkenyl group and phenyl group; X represents the same or different hydrolyzable group, and an organosilane represented by the following formula (II):

$$SiX_4 \qquad (II)$$

wherein X represents the same or different hydrolyzable group, with a $R^1/Si$ ratio being in a range of 0.9 to less than 1.0.

The process for producing spherical silicone fine particles of the present invention comprises:

(A) a step of mixing an organotrialkoxysilane represented by the following formula (III):

$$R^1Si(OR^2)_3 \qquad (III)$$

wherein $R^1$ represents a monovalent group selected from a group consisting of a substituted or unsubstituted alkyl group, alkenyl group and phenyl group; $R^2$ represents the same or different substituted or unsubstituted alkyl group; and a tetraalkoxysilane represented by the following formula (IV):

$$Si(OR^2)_4 \qquad (IV)$$

wherein $R^2$ represents the same or different substituted or non-substituted alkyl group such that a ratio of $R^1/Si$ is 0.9 to less than 1.0, adding thereto water in an amount of 20 to 150 moles per mole of the silane of the resulting mixture to conduct hydrolysis under an acidic condition, thereby obtaining an aqueous or alcohol solution of an organosilanol and/or the partial hydrolyzed product thereof; and (B) a step of adding an aqueous alkaline solution to the aqueous or alcohol solution of an organosilanol and/or the partial hydrolyzed product thereof obtained above, followed by mixing and mixed, and subjecting the organosilanol and/or the partial hydrolyzed product thereof to polycondensation under a stationary state to form spherical silicone fine particles.

DETAILED DESCRIPTION OF THE INVENTION

The present invention is described in detail below.

Examples of $R^1$ in an organotrialkoxysilane represented by the formula (I) used in the present invention include an alkyl group having 1 to 6 carbon atoms, an alkenyl group having 2 to 6 carbon atoms and a phenyl group. Those can be used alone or as mixtures thereof. Methyl group is preferable because of good reactivity.

Example of X in the general formula (I) or (II) is an alkoxy group represented by $OR^2$, which can be an organosiloxane partially comprising a halogen such as chlorine. Examples of $R^2$ of the alkoxy group represented by the above $OR^2$ include an alkyl group such as methyl, ethyl or butyl; and an alkoxy-substituted hydrocarbon group such as 2-methoxyethyl, or 2-ethoxyethyl. Methyl, ethyl and 2-methoxyethyl are preferable because of high hydrolysis rate. Examples of such a methyltrialkoxysilane include methyltrimethoxysilane, methyltriethoxysilane, methyltri-n-propoxysilane, methyltriisopropoxysilane, and methyltris(2-methoxyethoxy)silane. Those can be used alone or as mixtures thereof.

In the reaction in the process for producing spherical silicone fine particles of the present invention, when an organosilane wherein a halogen is bonded to Si is used, the hydrolysis rate is too high so that it is difficult to control the reaction. Therefore, an organotrialkoxysilane represented by the formula (III) and a tetraalkoxysilane represented by the formula (IV) are used. Examples of $R^2$ in $OR^2$ of the formulae (III) and (IV) include an alkyl group such as methyl, ethyl or butyl; and an alkoxy-substituted hydrocarbon group such as 2-methoxyethyl or 2-ethoxyethyl. Methyl, ethyl and 2-methoxyethyl groups are preferable because of high hydrolysis rate. Examples of such an organosilane include tetramethoxysilane, tetraethoxysilane, tera-n-propoxysilane, tetraisopropoxysilane and tetra(2-methoxyethoxy)silane. Those compounds can be used alone or as mixtures thereof.

In first step (A) in the process for producing spherical silicone fine particles, an organotrialkoxysilane represented by the formula (III) and a tetraalkoxysilane represented by the formula (IV) are hydrolyzed under an acidic condition to obtain an aqueous or alcohol solution of an organosilanol and/or the partial hydrolyzed product thereof.

A mixing ratio of the organotrialkoxysilane represented by the formula (III) and the organotetraalkoxysilane represented by the formula (IV) is 0.9 to less than 1.0, preferably 0.92 to 0.98, in terms of a $R^1/Si$ ratio. When the $R^1/Si$ ratio approaches 1.0, an average particle size distributes in a narrow range. However, the yield tends to lower. Contrary to this, when the $R^1/Si$ ratio approaches 0.9, an average particle size distributes in a wide range. However, the yield becomes high. Therefore, a mixing ratio should be controlled according to the purpose of use.

Either an organic acid and an inorganic acid can be used as an acid used in the present reaction. Examples of the organic acid include formic acid, acetic acid, propionic acid, oxalic acid and citric acid. In view of ease in controlling a partial condensation reaction of the generated organosilanol, acetic acid is particularly preferable. Any inorganic acid can be used as the inorganic acid so long as impurities such as an ionic substance which limits the use of finally obtained silicone fine particles do not remain. Hydrochloric acid is particularly preferable because of being readily available.

Hydrogen chloride contained in a trace amount as an impurity of a silane or organochlorosilanes such as an organotrichlorosilane can be used as a catalyst or a catalyst precursor. The amount of an acid used varies depending upon a kind of a silane and an acid and an amount of water used. However, an acid concentration of an aqueous acid solution prepared by dissolving the acid in water is preferably in a range of $(1 \text{ to } 100) \times 10^{-5}$ N. If the acid concentration is less than $1 \times 10^{-5}$ N, hydrolysis does not proceed adequately. On the other hand, if it exceeds $100 \times 10^{-5}$ N, it is difficult to control hydrolysis reaction, making it difficult to optionally control an average particle size of finally obtained silicone fine particles.

An amount of water used in hydrolysis is preferably 20 to 150 moles per mole of the silane. If the amount of water is less than 20 moles, agglomeration among fine particles formed tends to occur. On the other hand, if it exceeds 150 moles, the yield of silicone fine particles finally obtained is decreased, so that the productivity thereof is also decreased. Water used for hydrolysis preferably has a high purity such that impurities such as an ionic substance which limits the use of finally obtained silicone fine particles do not remain. Namely, water having an electric conductance of 50 mS/m or less is preferably used. In particular, ion-exchanged water having an electric conductance of 2 mS/m or less is more preferably used.

Hydrolysis reaction is not particularly limited. However, in order to effectively obtain an organosilanol and/or the partial condensation product thereof, the reaction is preferably conducted in a state such that a temperature in a range of 10 to 60° C. is maintained for 1 to 6 hours.

Thus, according to step (A), a silane used is hydrolyzed so that an organosilanol and/or the partial condensation product thereof is obtained in the form of a solution formed by dissolving the same in a mixture comprising an excess amount of water other than water consumed in the hydrolysis and an alcohol or a substituted alcohol formed by the reaction.

Second step (B) of the production process of the present invention is a step of obtaining spherical silicone fine particles from the aqueous or alcohol solution of an organosilanol and/or the partial hydrolyzed product thereof obtained in first step (A) (hereinafter this solution is referred to as a "silanol solution") by polycondensation reaction. The reaction in this second step is performed by adding an aqueous alkaline solution to the silanol solution obtained, mixing the resulting mixture, and then placing the uniformly mixed reaction system in a stationary state. Those procedures should be performed rapidly.

The aqueous alkaline solution shows basic property, and functions as a neutralizing agent of an acid used in the first step and also functions as a catalyst of the polycondensation in the second step.

Examples of an alkaline substance of such an aqueous alkaline solution include alkali metal hydroxides such as lithium hydroxide, sodium hydroxide and potassium hydroxide; ammonia; and organic amines such as monomethylamine and dimethylamine. Of those compounds, ammonia and organic amines are preferable because even a trace amount of impurities, which limit the use of the resulting spherical silicone fine particles, does not remain. Further, ammonia is particularly preferable because of being easily removed.

The aqueous alkaline solution is used in an amount so as to neutralize an acid and also effectively function as a catalyst in a polycondensation reaction. Further, it is used in the amount which can maintain a time capable of rapidly placing a reaction system prepared by rapid addition and uniform mixing in a stationary state prior to formation and deposition of silicone fine particles. Namely, on the premise that the amount of an aqueous alkaline solution used exceeds an amount required for neutralization of an acid, an aqueous ammonia solution having a concentration of 0.1 to 0.5% is used in an amount of 0.5 to 30 parts by weight per 100 parts by weight of the silanol solution obtained in the first step.

In second step (B), the silanol solution is charged into a reaction vessel and the alkaline solution was added to the silanol solution. The resulting solution is rapidly and uniformly mixed by an optional means such as stirring. The addition method is not particularly limited so long as the addition can be effectively made within a minimum mixing time. The alkaline solution may be added from the above the silanol solution or maybe introduced into the silanol solution through a nozzle. The mixing time is one which is required to dissolve an alkali catalyst in a reaction system, appropriately a time as short as possible. For example, the mixing time including the addition time is 0.5 to 10 minutes, preferably 0.5 to 3 minutes, at a temperature of 5 to 30° C., preferably 10 to 20° C.

After uniformly mixing, the resulting system is allowed to stand to complete polycondensation. The procedure of allowing the system to stand can provide spherical silicone particles having a desirable average particle size and also can provide an excellent efficiency to time and the capacity of an apparatus. For example, such a procedure is conducted for 2 to 24 hours, preferably 2 to 10 hours, while maintaining the above-described mixing temperature.

By conducting polycondensation in second step (B) spherical silicone fine particles can be obtained in a water/alcohol mixture in the form of dispersion or sol. Spherical silicone particles obtained in accordance with the present invention in the form of dispersion or sol can be used as they are. Further, depending upon the necessity, appropriate treatments such as filtration, drying and pulverization are applied thereto, whereby the spherical silicone particles can be recovered as finely divided powder. An average particle diameter of silicone fine particles can be controlled by varying a proportion of a tetraalkoxysilane used in hydrolysis, an amount of water used in hydrolysis, and an amount of an alkali used in polycondensation.

The present invention will be further described in detail by the following Examples and Comparative Examples. In these Examples, parts and percents are by weight. The evaluation method of fine particles shown in the Examples is for an average particle diameter ($\mu$m) of 50 or more particles calculated from a scanning electron microscope photograph and roundness (ratio of short diameter of particle/long diameter of particle). The present invention is not limited to those Examples.

EXAMPLE 1

First Step 53 moles of ion-exchanged water having an electric conductance of 0.10 mS/m determined using an electric conductivity meter (CM-11P, manufactured by Toa Denpa Kogyo Co., Ltd.) were charged in a reaction vessel equipped with a thermometer, a reflux condenser and a stirrer. Hydrochloric acid was then added thereto such that an acid concentration was $5\times10^{-5}$ N. 1 mole of a silane mixture prepared by blending methyltrimethoxysilane and tetramethoxysilane was added to the resulting solution such that the methyl/Si ratio was 0.98, while stirring the resulting solution at 25° C. As a result, hydrolysis proceeded and temperature rose to 31° C. in about 15 minutes. Stirring was further continued for 5 hours, and the resulting reaction mixture was then cooled to 10° C. to obtain a silanol solution.

Second Step

With stirring the silanol solution obtained in the first step at 10° C., 32 Parts ($7\times10^{-3}$ moles) of 0.37% aqueous ammonia solution was added thereto, and the resulting solution was stirred for 3 minutes. Stirring was stopped and the resulting reaction mixture was allowed to stand for 4 hours.

In this step, particles were deposited at about 9 minutes after addition of the aqueous ammonia solution, and the reaction vessel was entirely white-turbid. The reaction solution was allowed to stand for 4 hours, and then passed through a wire mesh of 200 mesh. The resulting solution was subjected to suction-filtration to obtain a wet cake. The wet cake thus obtained was dried at 200° C. for 12 hours to obtain 65 parts of white powder, which corresponded to 95% of the theoretical yield based on the amount of the silane used, and also corresponded to 4.5% as the yield to the total charge weight.

The observation of the white powder obtained with an electron microscope showed that the particles were each independent and had a truly spherical shape. The white powder had an average particle size of 2.43 $\mu$m and a roundness of 0.98.

This powder was placed in a porcelain crucible, and was thermally decomposed by heating to 900° C. in air. As a result, the residual amount was 89.0%, which was a value approximate to the theoretical value of 89.7% in a case where silicone is subjected to oxidative thermal decomposition to convert to silicon dioxide. As a result of X-ray analysis of this thermal decomposition product, it was confirmed that the product was amorphous silica.

The results obtained are shown in Table 1 below.

EXAMPLES 2 TO 6

The same procedure as in Example 1 was followed except that the amounts of water, tetramethoxysilane and aqueous ammonia were changed. The results obtained are shown in Table 1 below.

As shown in Table 1, it was confirmed that where the amount of water charged per mole of a silane was the same (Examples 1, 2 and 3, or Examples 4, 5, and 6), an average particle diameter became small with increasing the amount of tetramethoxysilane.

COMPARATIVE EXAMPLE 1

First Step 58 moles of ion-exchanged water having an electrical conductance of 0.09 mS/m were charged in a reaction vessel equipped with a thermometer, a reflux condenser and a stirrer. Hydrochloric acid was added thereto such that the acid concentration was $5\times10^{-5}$ N. With stirring the resulting solution at 25° C., 1 mole of a silane mixture prepared by blending methyltrimethoxysilane and tetramethoxysilane was added thereto such that the ratio of methyl/Si was 0.88.

As a result, hydrolysis proceeded and temperature rose to 29° C. in about 15 minutes. Stirring was further continued for 3 hours, and the resulting reaction mixture was then cooled to 10° C. to obtain a silanol solution.

Second Step

With stirring the silanol solution obtained in the first step at 10° C., 30 parts of 0.37% aqueous ammonia solution were added thereto, and the resulting solution was stirred for 3 minutes. Stirring was stopped and the resulting reaction mixture was allowed to stand for 4 hours. In this step, at about 10 minutes after the addition of the aqueous ammonia solution, the entire content in the reaction vessel was white-turbid. The reaction solution obtained after allowing to stand for 4 hours was not a dispersion containing the powder, but was gelatinous mass in the state of yogurt.

The results obtained are shown in Table 1 below.

TABLE 1

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Charged: | | | | | | | | | |
| Silane (mol) | 1 | 1 | 1 | 1 | 1 | 1 | 1 | 1 | 1 |
| Tetramethoxysilane (mol) | 0.02 | 0.05 | 0.08 | 0.02 | 0.05 | 0.08 | 0.12 | 0.02 | 0 |
| Ratio of Me/Si | 0.98 | 0.95 | 0.92 | 0.98 | 0.95 | 0.92 | 0.88 | 0.98 | 1.00 |
| Ion-exchanged water (mol) | 53 | 53 | 53 | 21 | 21 | 21 | 58 | 14 | 50 |
| Ammonia ($10^{-3}$ mol) | 7 | 7 | 7 | 3 | 3 | 3 | 7 | 3 | 200 |
| Reaction record: | | | | | | | | | |
| Ion-exchanged water electrical conductance (mS/m) | 0.10 | 0.10 | 0.09 | 0.10 | 0.10 | 0.10 | 0.09 | 0.09 | — |
| Hydrolysis maximum temperature (° C.) | 31 | 30 | 31 | 39 | 39 | 40 | 29 | 44 | — |
| Time (minute) | 15 | 10 | 15 | 20 | 20 | 20 | 15 | 30 | — |
| Particle formation time (minute) | 9 | 10 | 11 | 18 | 21 | 20 | 10 | 35 | — |
| Theoretical yield (%) | 96 | 95 | 91 | 97 | 96 | 95 | — | — | 72 |
| Yield to charge weight (%) | 4.5 | 4.6 | 4.6 | 10.0 | 10.1 | 10.3 | — | — | 3.9 |
| Physical properties: | | | | | | | | | |
| Average particle diameter ($\mu$m) | 2.43 | 0.96 | 0.42 | 3.61 | 3.16 | 2.57 | — | — | 1.90 / 0.94 |
| Roundness | 0.98 | 0.96 | 0.96 | 0.97 | 0.95 | 0.96 | — | — | |
| Particle shape | Truly spherical | Truly spherical | Truly spherical | Truly spherical | Truly spherical | Truly spherical | — | — | Truly spherical |

COMPARATIVE EXAMPLE 2

First Step 14 moles of ion-exchanged water having an electrical conductance of 0.09 mS/m were charged in a reaction vessel equipped with a thermometer, a reflux condenser and a stirrer. Hydrochloric acid was added thereto such that the acid concentration was $5\times10^{-5}$ N. With stirring the resulting solution at 25° C., 1 mole of a silane mixture prepared by blending methyltrimethoxysilane and tetramethoxysilane was added thereto such that the ratio of methyl/Si was 0.98. As a result, hydrolysis proceeded and temperature rose to 44° C. in about 30 minutes. Stirring was further continued for 4 hours, and the resulting reaction mixture was then cooled to 10° C. to obtain a silanol solution.

Second Step

With stirring the silanol solution obtained in the first step at 10° C., 13 parts of 0.37% aqueous ammonia solution were added thereto, and the resulting solution was stirred for 3 minutes. Stirring was stopped and the resulting reaction mixture was allowed to stand for 4 hours. In this step, the entire content in the reaction vessel was white-turbid at about 35 minutes after the addition of the aqueous ammonia solution. The reaction solution obtained after allowing to stand for 4 hours was not a dispersion containing the powder, but was gelatinous mass in the state of yogurt.

The results obtained are shown in Table 1 below.

COMPARATIVE EXAMPLE 3

According to the Example described in JP-A-63-77940, 900 parts (water 50 moles) of 0.37% aqueous ammonia were charged in a reaction vessel equipped with a thermometer, a reflux condenser and a stirrer. With stirring this aqueous solution at a rate of 5 rpm, 1 mole of methyltrimethoxysilane was rapidly added thereto in a manner such that methyltrimethoxysilane was not mixed into the aqueous ammonia solution. Thus, two layers-state was formed wherein the upper layer was a methyltrimethoxysilane layer and the lower layer was the aqueous ammonia solution. By setting a rate of a stirrer at 20 rpm, hydrolysis and condensation reaction were performed at the interface of methyltrimethoxysilane and the aqueous ammonia solution while maintaining the two layers-state. With proceeding the reaction, the reaction product gradually settled to the lower layer, and the reaction product was suspended in the lower layer to form white-turbidity. The upper layer, i.e., the methyltrimethoxysilane layer, was gradually thinner and thinner and after about 3 hours, finally disappeared by the visual observation. Further, with maintaining the temperature at 50 to 60° C., stirring was conducted for 3 hours under the same conditions, and the resulting reaction mixture was then cooled to 25° C. The precipitated reaction product was passed through a wire mesh of 200 mesh, followed by suction-filtration to obtain a wet cake. The wet cake thus obtained was dried at 200° C. for 12 hours to obtain 39 parts of white powder, which corresponded to 72% of the theoretical yield based on the amount of the silane used, and also corresponded to 3.9% as the yield to the total amount charged.

Observation of the white powder obtained with an electron microscope showed that the particles were each independent and had a truly spherical shape. The white powder had an average particle size of 1.90 μm and a roundness of 0.94.

The results obtained are shown in Table 1 above.

EXAMPLES 7 TO 9 AND CCOMPARATIVE EXAMPLE 4

The same procedure as in Example 1 was followed except that the ratio of methyl/Si was varied. The results are shown in Table 2 below.

As shown in Table 2, truly spherical silicone fine particles were obtained even in a case of methyl/Si=1.0 (Comparative Example 4). However, it was confirmed that where the amount of water charged per 1 mole of a silane was fixed, the average particle diameter of the particles obtained became small with increasing the amount of tetramethoxysilane added.

The results obtained are shown in Table 2 below.

TABLE 2

|  | Comparative Example 4 | Example 7 | Example 8 | Example 9 |
|---|---|---|---|---|
| Charged: |  |  |  |  |
| Silane (mol) | 1 | 1 | 1 | 1 |
| Tetramethoxysilane (mol) | 0 | 0.02 | 0.05 | 0.08 |
| Ratio of Me/Si | 1.00 | 0.98 | 0.95 | 0.92 |
| Ion-exchanged water (mol) | 30 | 30 | 30 | 30 |
| Ammonia ($10^{-3}$ mol) | 4 | 4 | 4 | 4 |
| Reaction record: |  |  |  |  |
| Ion-exchanged water electric conductance (mS/m) | 0.10 | 0.10 | 0.10 | 0.10 |
| Hydrolysis maximum temperature (° C.) | 33 | 35 | 34 | 35 |
| Time (minute) | 15 | 15 | 15 | 15 |
| Particle formation time (minute) | 14 | 12 | 12 | 13 |
| Theoretical yield (%) | 97 | 93 | 94 | 96 |
| Yield to charged amount (%) | 7.3 | 7.1 | 7.4 | 7.8 |
| Physical properties: |  |  |  |  |
| Average particle diameter (μm) | 5.23 | 2.84 | 2.04 | 1.62 |
| Roundness | 0.98 | 0.97 | 0.95 | 0.98 |
| Particle shape | Truly spherical | Truly spherical | Truly spherical | Truly spherical |

According to the present invention, spherical silicone particles wherein the particle diameter is controlled in a range of 1 to 5 μm can effectively be produced to time and the capacity of an apparatus. The production process of the present invention is the most effective in applying to the production of spherical silicone particles having an average particle diameter of 0.1 to 5 μm, which could not be effectively produced according to conventional processes. The spherical silicone particles obtained according to the production process of the present invention are insoluble in an organic solvent and do not melt. Further, the surface thereof is excellent in water repellency and lubricating property. Still further, the spherical silicone particles obtained have a smaller specific gravity than that of an inorganic powder, while being excellent in thermal resistance compared with an organic powder, and have low agglomeration property and excellent dispersibility. Thus, because of those properties, the spherical silicone particles obtained are useful as a filler or a lubricating improver of paints, plastics, rubbers, papers and cosmetics, and are also useful as an additive for modification of plastics which are used for imparting light scattering function to an optical liquid crystal display.

What is claimed is:

1. Spherical silicone fine particles, which have an average particle diameter of 0.1 to 5 μm, obtained by polycondensation reaction of an organotrialkoxysilane represented by the following formula (I):

$$R^1Si(X)_3 \tag{I}$$

wherein $R^1$ represents a monovalent group selected from a group consisting of a substituted or unsubstituted alkyl group, alkenyl group and phenyl group; X represents the same or different hydrolyzable group, and an organosilane represented by the following formula (II):

$$SiX_4 \tag{II}$$

wherein X represents the same or different hydrolyzable group, with $R^1$/Si ratio being in a range of 0.92 to 0.98.

2. A process for producing spherical silicone fine particles, which have an average particle diameter of 0.1 to 5 μm, comprising:

(A) a step of mixing an organotrialkoxysilane represented by the following formula (III):

$$R^1Si(OR^2)_3 \tag{III}$$

wherein $R^1$ represents a monovalent group selected from a group consisting of a substituted or unsubstituted alkyl group, alkenyl group and phenyl group; $R^2$ represents the same or different substituted or unsubstituted alkyl group; and a tetraalkoxysilane represented by the following formula (IV):

$$Si(OR^2)_4 \tag{IV}$$

wherein $R^2$ represents the same or different substituted or non-substituted alkyl group such that a ratio of $R^1$/Si is 0.92 to 0.98, adding thereto water in an amount of 20 to 150 moles per mole of the silane of the resulting mixture to conduct hydrolysis under an acidic condition, thereby obtaining an aqueous or alcohol solution of an organosilano and/or the partial hydrolyzed product thereof; and (B) a step of adding an aqueous alkaline solution to the aqueous or alcohol solution of an organosilanol and/or the partial hydrolyzed product thereof obtained above, followed by mixing and mixed, and subjecting the organosilanol and/or the partial hydrolyzed product thereof to polycondensation under a stationary state to form spherical silicone fine particles.

* * * * *